United States Patent [19]
Yoshimura et al.

[11] Patent Number: 4,864,430
[45] Date of Patent: Sep. 5, 1989

[54] VIDEO SIGNAL REPRODUCING APPARATUS WITH MEMORY AND CAPABILITY FOR REPRODUCING AT DIVERSE REPRODUCTION SPEEDS

[75] Inventors: Katsuji Yoshimura, Kanagawa; Susumu Kozuki, Tokyo; Hiroo Edakubo, Kanagawa; Chikara Sato, Kanagawa; Koji Takahashi, Kanagawa, all of Japan

[73] Assignee: Canon Kabushiki Kaisha, Tokyo, Japan

[21] Appl. No.: 62,929

[22] Filed: Jun. 16, 1987

[30] Foreign Application Priority Data

Jun. 23, 1986 [JP] Japan ............................ 61-144924
Jun. 23, 1986 [JP] Japan ............................ 61-144925
Jul. 10, 1986 [JP] Japan ............................ 61-160839

[51] Int. Cl.$^4$ .......................................... H04N 5/782
[52] U.S. Cl. ............................... 360/10.2; 360/10.3; 360/35.1; 360/77.01
[58] Field of Search .................... 360/10.1, 10.2, 10.3, 360/11, 33.1, 35.1, 77, 78, DIG. 1, 77.01

[56] References Cited

U.S. PATENT DOCUMENTS 4,439,791 3/1984 Hirata ........................... 360/10.2 X
4,477,843 10/1984 Kinjo et al. ................... 360/10.1 X

*Primary Examiner*—Robert L. Richardson
*Attorney, Agent, or Firm*—Robin, Blecker, Daley & Driscoll

[57] ABSTRACT

A video signal reproducing apparatus is provided with a memory which is capable of storing a portion of a video signal covering a predetermined period of time and is arranged: To allow a record bearing medium on which the predetermined period portion of the video signal is recorded in each of many recording tracks formed in parallel to travel at a given speed different from a speed employed in recording; and to decide whether or not each of the video signal portions reproduced by a reproducing head is to be stored by making the decision on the basis of the signal reproduced from each of the tracks by the reproducing head.

27 Claims, 12 Drawing Sheets

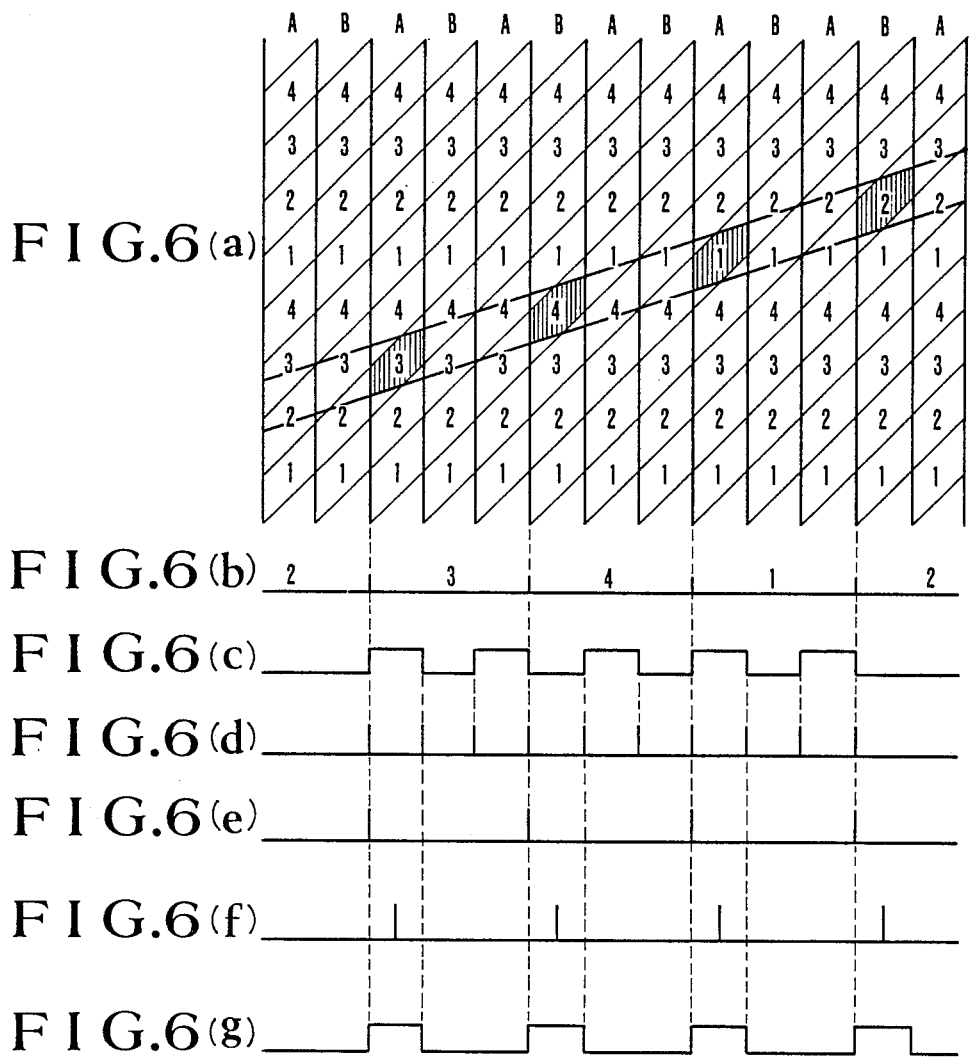

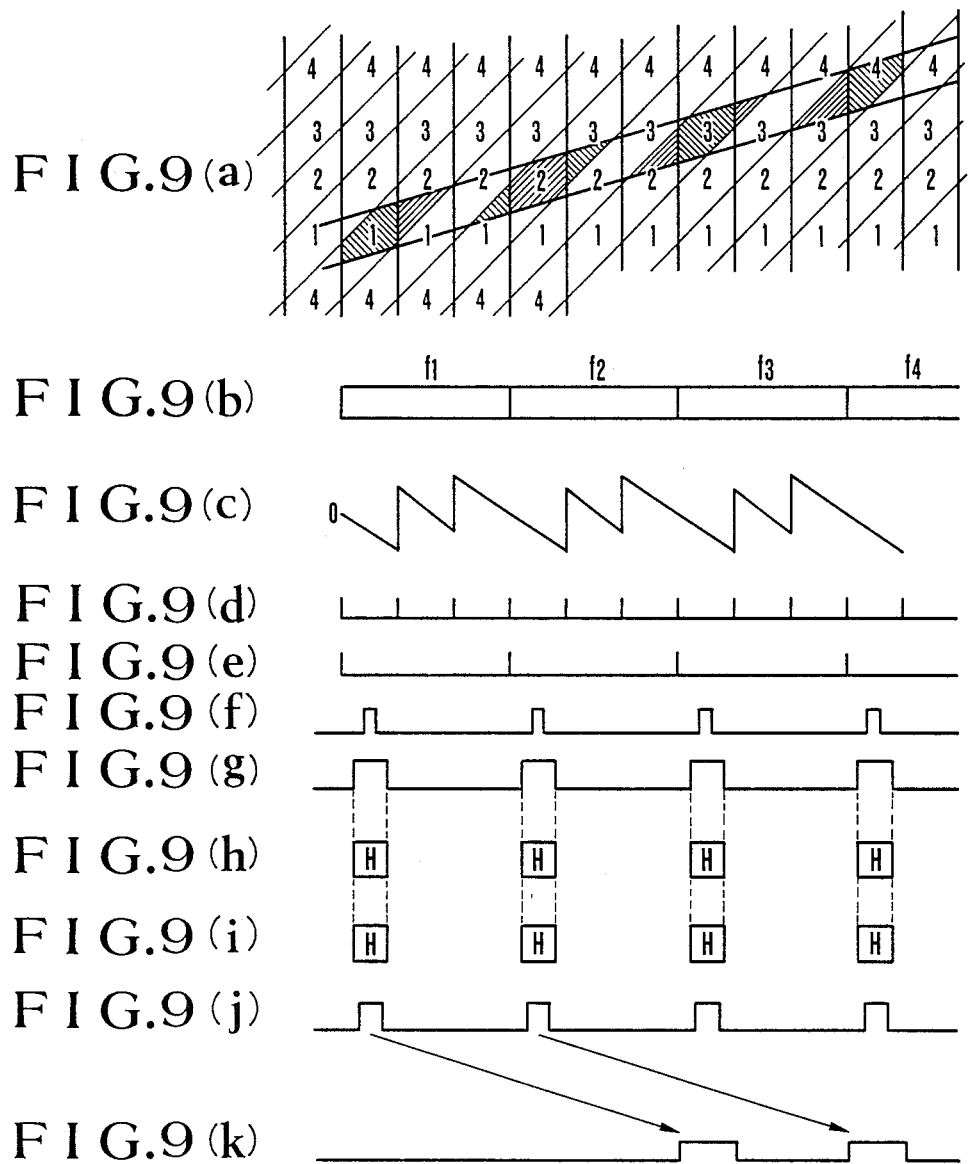

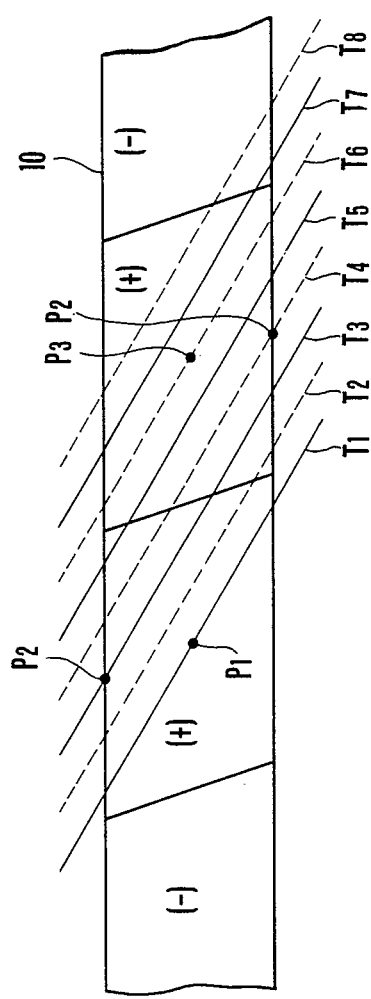
FIG.12
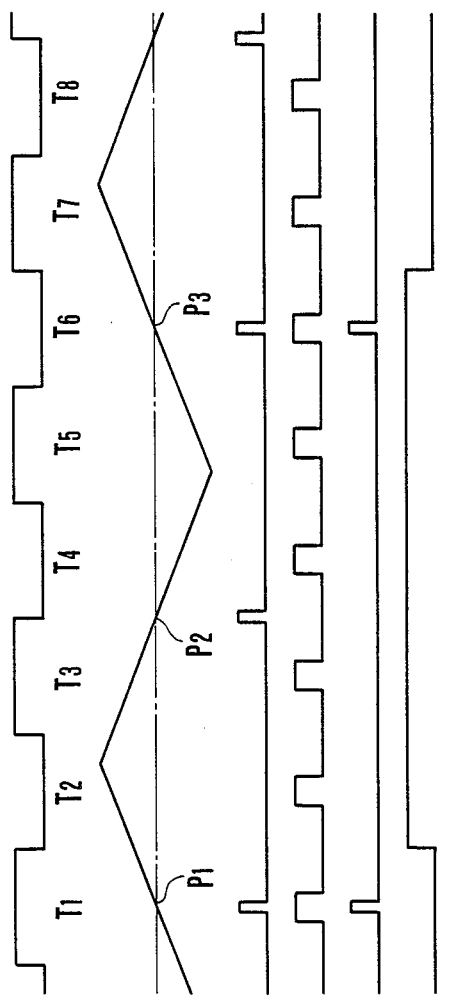
FIG.13(a) 30PG
FIG.13(b) ATF SIGNAL
FIG.13(c) ZERO-CROSSING PULSES
FIG.13(d) CENTER PULSES
FIG.13(e) JUST TRACKING PULSES
FIG.13(f) SWITCHING SIGNAL

VIDEO SIGNAL REPRODUCING APPARATUS WITH MEMORY AND CAPABILITY FOR REPRODUCING AT DIVERSE REPRODUCTION SPEEDS

BACKGROUND OF THE INVENTION

1. Field of the Invention

This invention relates to a video signal reproducing apparatus and more particularly to a video signal reproducing apparatus having a memory which is capable of storing a predetermined period portions of the video signal.

2. Description of the Related Art

The conventional reproducing apparatus of the above stated kind include a rotary head type video signal reproducing apparatus (hereinafter referred to as VTR) which is provided with two oppositely arranged magnetic heads having different azimuth angles. The known tracking control methods applicable to the VTR of this type include a method of using pilot signals of four different frequency values. This tracking control method has been employed even in carrying out a special reproducing operation called slow motion reproduction.

FIG. 1 of the accompanying drawings shows in a block diagram the above stated tracking control method of using the pilot signals of four different frequency values as applied to a slow motion reproducing operation. FIGS. 2(a) to 2(d) and 3(a) to 3(d) respectively show, in timing charts, the reproducing operations performed by the conventional VTR at tape travel speeds ½ and ⅓ of a normal reproducing tape speed. Of these drawings, FIGS. 2(a) and 3(a) analytically show track patterns representing the tracing state of the head of the apparatus obtained on a magnetic recording tape during the slow reproducing operation. FIGS. 2(b) and 3(b) show the relation of local pilot signals to the fields. FIGS. 2(c) and 3(c) show the voltage wave forms of tracking error signals obtained by the four frequency method. FIGS. 2(d) and 3(d) show the wave forms of sampling pulses produced for the purpose of sampling ATF signals.

Referring to FIG. 1, among the components of a reproduced video signal coming via an input terminal 101, a pilot signal component is alone extracted from the reproduced video signal by a low-pass filter 102 (hereinafter referred to as LPF). The pilot signal component and a local pilot signal which is generated by a local pilot signal generator 103 are subjected to a multiplying operation performed by a multiplier 104. The output of the multiplier 104 is supplied to an ATF signal generating circuit 105. The circuit 105 then produces an analog ATF signal which corresponds to tracking deviation and is obtained in a known manner. The ATF signal thus produced is sampled and held by a sample-and-hold circuit 106 in accordance with sampling pulses coming from a sampling pulse generator 108. The output of the circuit 106 is used as a signal for phase control over a capstan motor system.

In slow motion reproduction, the local pilot signal generator 103 and a sampling pulse generator 108 are controlled by a system controller 107 as described below with reference to FIGS. 2(a) to 2(d) and 3(a) to 3(d):

In each of FIGS. 2(a) and 3(a), the axis of abscissa shows a time base, with one pitch thereof corresponding to one field period. The axis of ordinate shows an extent to which the tape is moved, with one pitch thereof corresponding to one track pitch. Numerals 1, 2, 3 and 4 written in these drawings represent the suffixes of the reference symbols denoting the frequency values of the above stated pilot signals of four different frequency values f1, f2, f3 and f4 which are superimposed on the video signal recorded on the tape.

During ordinary reproduction, tracking control is performed in the following manner: A track A1 in which the pilot signal of the frequency f1 is recorded is first traced by a rotary head. A track B1 in which the pilot signal of the frequency f2 is recorded is next traced. A track A2 in which the pilot signal of the frequency f3 is recorded is then traced. After that, a track B2 in which the pilot signal of the frequency f4 is recorded is traced by the head.

In the ½ speed reproduction, the head traces the tape as indicated by thick lines in FIG. 2(a). In this instance, a reproduced signal is obtained and produced from hatched parts between the thick lines. As obvious from FIG. 2(a), the reproduction output becomes zero to generate a noise bar once in every four fields. However, the noise bar can be prevented from appearing on a picture plane by performing the tracking control to have the timing of its occurrence at the end of or beginning of each field as shown in the drawing. In view of this, the conventional apparatus has been arranged to control the relative position of the tape and the head in such a way as to obtain a ½ speed tracing state which is as indicated by the thick lines in FIG. 2(a) and is considered to be the optimum condition. To accomplish the tracking control, the local pilot signals which are to be used for the multiplying operation by the multiplier 104 are generated by the local pilot signal generator 103 in rotation of frequency values in such a manner that the local pilot signal of the frequency f1 is generated for two field periods, then the local pilot signal of the frequency f2 for next two field periods and so on as shown in FIG. 2(b).

Further, as shown in FIG. 2(d), the system controller 107 produces, during the ½ speed reproduction, one sampling pulse for every two field periods at a point of time at which one field is changed over to another. With the ATF signal voltage which is as shown in FIG. 2(c) sampled and held according to such sampling pulses, the ATF signal voltage is sampled and held just at the zero level thereof under the above stated optimum condition. Therefore, tracking can be accomplished in the best state as mentioned above in accordance with the ATF signal.

In the case of the ⅓ speed reproduction which is as shown in FIG. 3(a), the generation of the local pilot signals is also changed from the local pilot signal of one frequency over to the signal of another frequency once for every three fields in a manner similar to the ½ speed reproducing operation shown in FIG. 2(a). Then, as obvious from FIG. 3(d), each of the ATF signal sampling pulses is controlled to be produced for every three fields at the middle point of the three-field period, because: The ATF signal is at zero level in the middle part of this period in the best tracking state as shown in FIG. 3(a).

The operating timing of the system controller 107 is determined by a rectangular wave signal of 30 Hz (hereinafter referred to as 30 PG signal) which is in synchronism with the rotation of the rotary head.

As mentioned in the foregoing, practice has been to perform tracking control for slow motion reproduction with an effort to have noise occurring outside of the picture plane. In other words, the point of time at which the reproduction output diminishes to a great extent is arranged to occur at a boundary between one field and another and not to occur in the middle of any of the fields. However, this conventional arrangement has presented a problem in that: It becomes largely impossible to obtain an adequately reproduced picture when the output level for a certain field is somewhat low as a whole, because a sufficiently large dynamic range cannot be obtained for such a field.

Further, it has been attempted to obtain an adequately reproduced slow motion picture by intermittently driving the tape in such a way as to alternate ordinary reproduction and still picture reproduction. However, the arrangement to intermittently drive the tape is not desirable because, compared with driving the tape at a constant speed, such arrangement imposes a larger mechanical load on the apparatus.

SUMMARY OF THE INVENTION

It is a general object of this invention to provide a video signal reproducing apparatus which is capable of solving the problems of the prior art mentioned in the foregoing.

It is a more specific object of this invention to provide a video signal reproducing apparatus which is capable of adequately performing reproduction at an altered speed even with a record bearing medium allowed to travel at a constant speed.

Under this object, a video signal reproducing apparatus, arranged as an embodiment of this invention to reproduce a video signal from a record bearing medium on which a predetermined portion of the video signal for a predetermined period of time is recorded in each of many recording tracks formed in parallel with each other, comprises: a reproducing head arranged to trace the record bearing medium; memory means arranged to receive the video signal reproduced by the reproducing head and to be capable of storing the predetermined period portion of the video signal; tracking error signal forming means for forming, on the basis of the signal reproduced by the reproducing head, a tracking error signal indicative of a relative position between the track and the head; moving means for moving the record bearing medium in a direction different from the medium tracing direction of the reproducing head; moving action control means for controlling and causing the moving means to move the record bearing medium at a speed different from a medium moving speed employed when the recording tracks are formed; writing control means for determining whether or not each of the predetermined portions of the video signal reproduced by the reproducing head is to be written into said memory means; sampling means for sampling the tracking error signal at intervals of a period of time an integral multiple of the predetermined period of time; and tracking control means for controlling, on the basis of the tracking error signal sampled by the sampling means, the relative position between the recording track and the reproducing head.

It is another object of this invention to provide a video signal reproducing apparatus which is capable of adequately accomplishing altered speed reproduction even in cases where the linearity of recording tracks on a record bearing medium is deteriorated.

It is a further object of this invention to provide a video signal reproducing apparatus which is capable of adequately accomplishing altered speed reproduction even in cases where a record bearing medium happens to be out of medium moving control.

Under that object, a video signal reproducing apparatus, arranged as an embodiment of this invention to reproduce a video signal from a record bearing medium on which a predetermined portion of the video signal for a predetermined period of time is recorded in each of many recording tracks formed in parallel with each other, comprises: a reproducing head arranged to trace the record bearing medium; memory means arranged to receive the video signal reproduced by the reproducing head and to be capable of storing the predetermined portion of the video signal reproduced by the reproducing head; tracking error signal forming means for forming, on the basis of the signal reproduced by the reproducing head, a tracking error signal indicative of a relative position between the track and the head; moving means for moving the record bearing medium in a direction different from the medium tracing direction of the reproducing head; moving action control means for controlling and causing the moving means to move the record bearing medium at a speed different from a medium moving speed employed when the recording tracks are formed; and writing control means for determining, on the basis of the tracking error signal, whether or not each of the predetermined portions of the video signal reproduced by the reproducing head is to be written into said memory means.

The above and other objects and features of this invention will become apparent from the following detailed description of embodiments thereof taken in connection with the accompanying drawings.

BRIEF DESCRIPTION OF THE DRAWINGS:

FIGS. 6(a) to 6(g) show in a timing chart the ⅓ reproducing operation of the VTR of FIG. 4.

FIGS. 9(a) to 9(k) show in a timing chart the ⅓ speed reproducing operation of the VTR of FIG. 7.

FIGS. 12 and 13(a) to 13(f) are illustrations showing the principle of the slow motion reproducing operation of the VTR of FIG. 10.

DETAILED DESCRIPTION OF PREFERRED EMBODIMENTS

Figure 1:
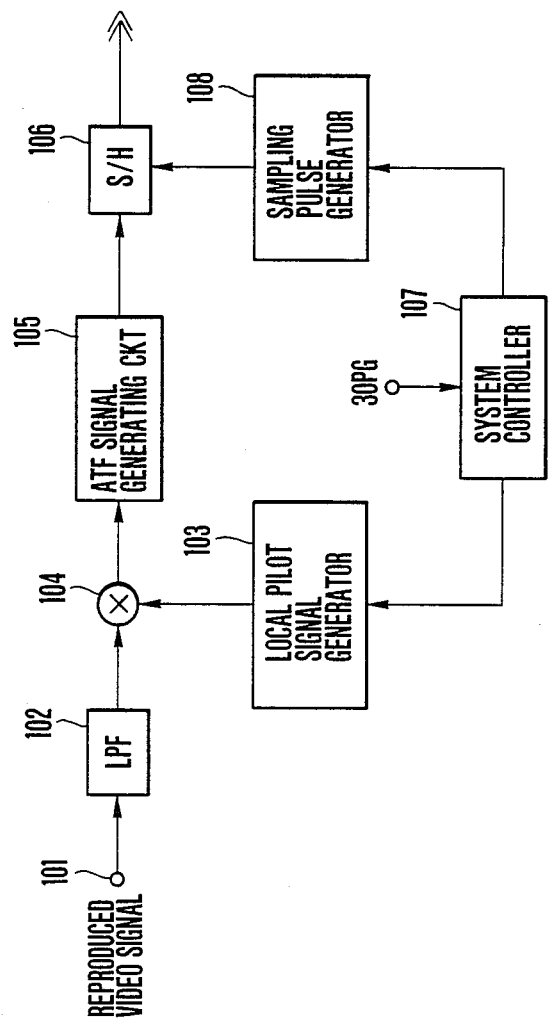
FIG. 1 is a block diagram showing the conventional tracking control system arranged for slow motion reproduction.
Figure 2:
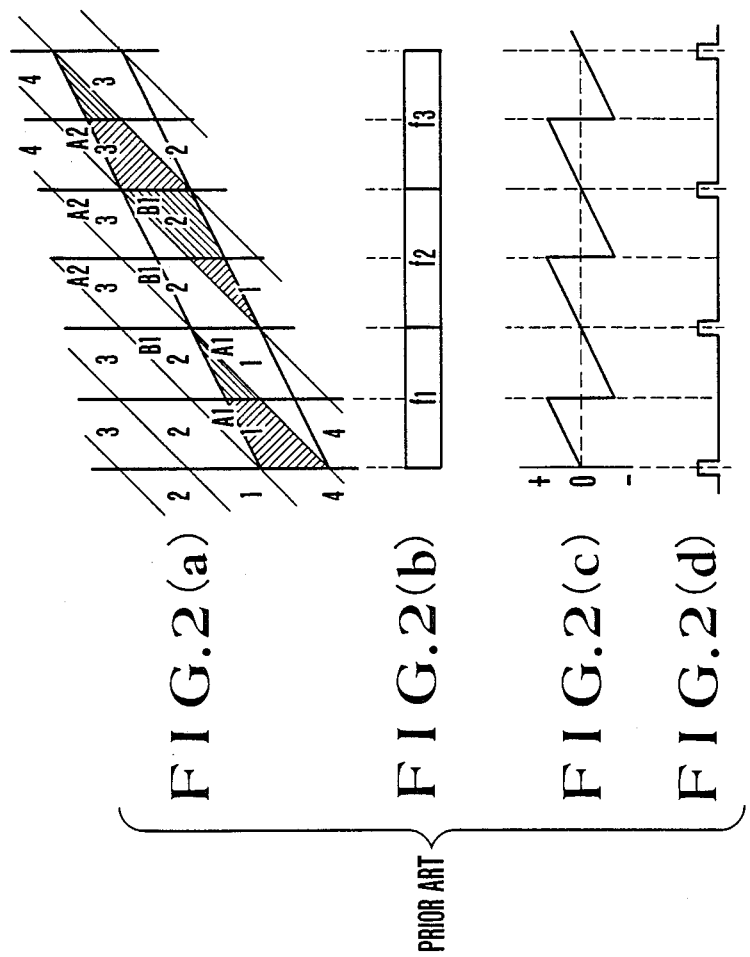
FIGS. 2(i a ) to 2(d) show in a timing chart the ½ speed reproducing operation of the conventional VTR.
Figure 3:
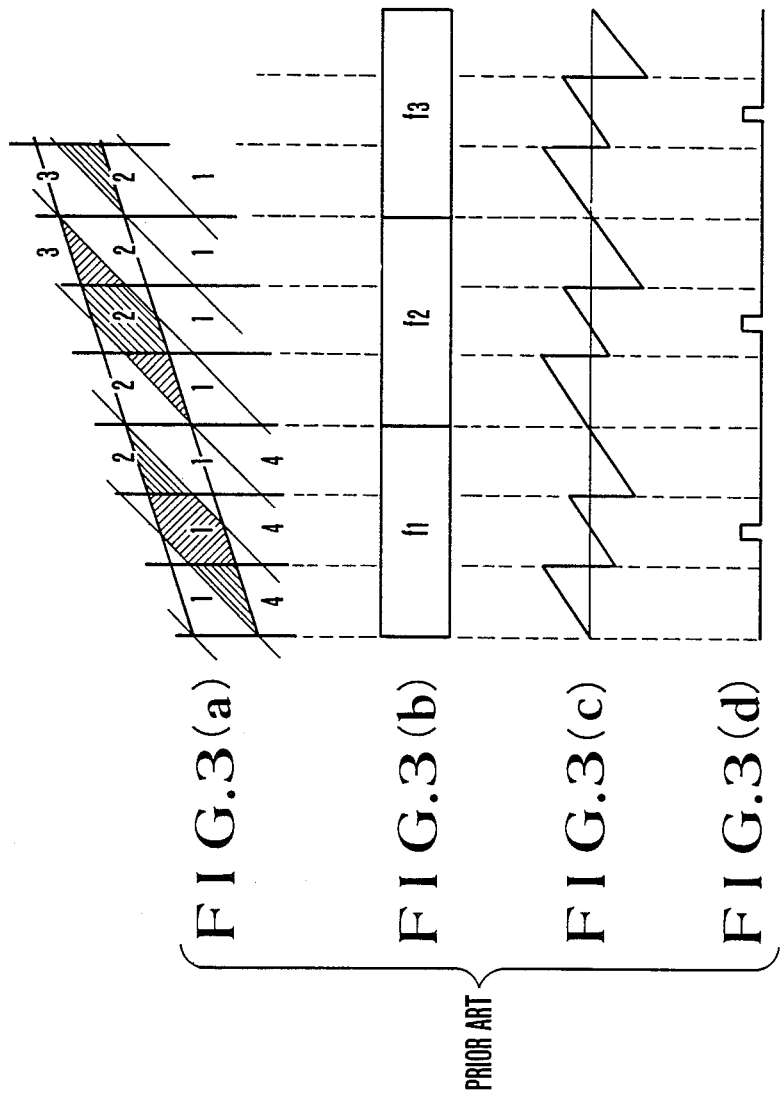
FIGS. 3(a) to 3(d) show in a timing chart the ⅓ speed reproducing operation of the conventional VTR.
Figure 4:
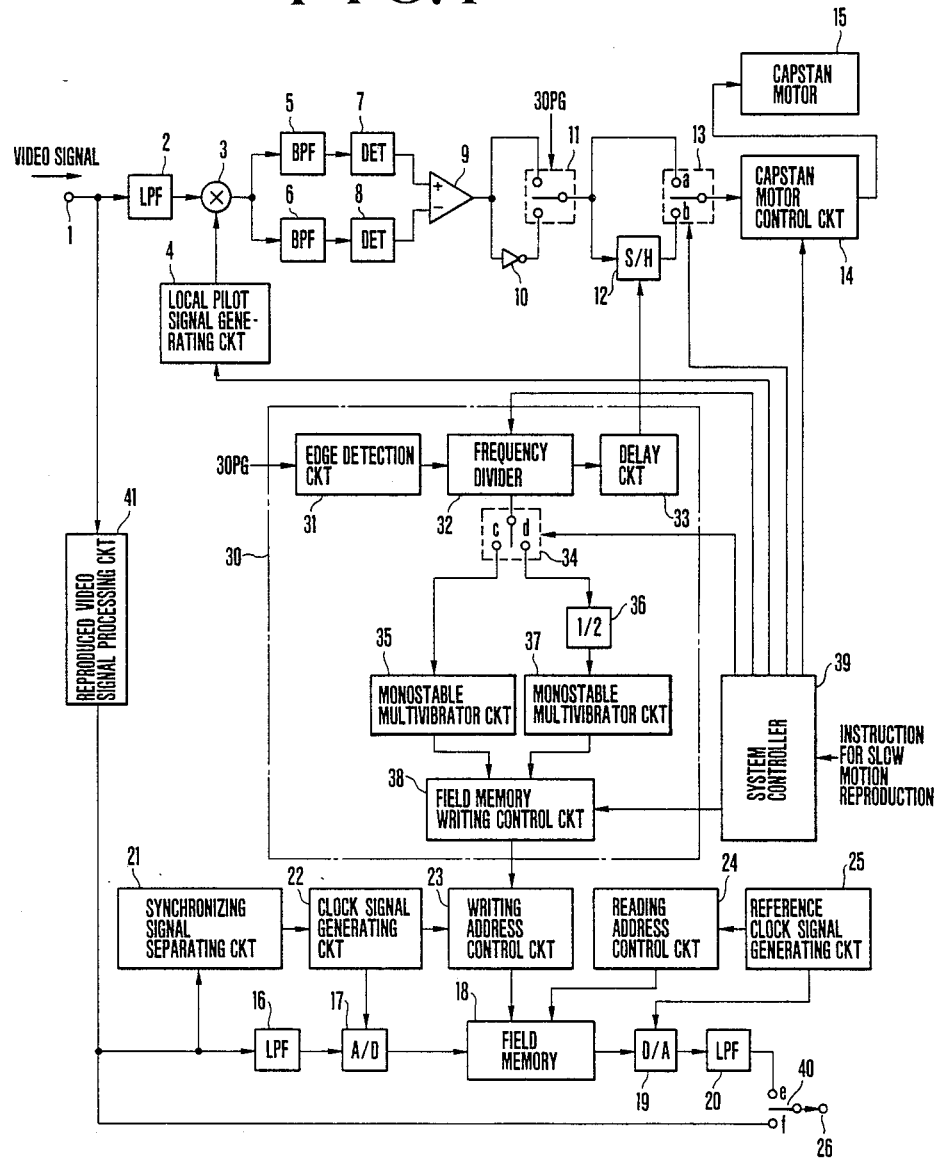
FIG. 4 is a block diagram showing the essential parts of the reproduction system of a VTR arranged as an embodiment of this invention.

FIG. 4 shows in a block diagram the essential parts of the reproduction system of a VTR arranged to use a field memory device according to this invention as an embodiment thereof. Referring to FIG. 4, a terminal 1 is arranged to receive a reproduced signal from two heads which are not shown. A terminal 26 is arranged to output a reproduced video signal. The VTR comprises low-pass filters (LPFs) 2, 16 and 20; a multiplier 3; a local pilot signal generating circuit 4; band-pass filters (BPFs) 5 and 6; detectors (DETs) 7 and 8; a differential amplifier 9; an inverter 10; switches 11, 13 and 34; a sample-and-hold (S/H) circuit 12; a capstan motor control circuit 14; a capstan motor 15; an analog-to-digital (A/D) converter 17; a field memory 18; a digital-to-analog (D/A) converter 19; a synchronizing signal separating circuit 21; a clock signal generating circuit 22; a writing address control circuit 23; a reading address control circuit 24; a reference clock signal generating circuit 25; an edge detection circuit 31; monostable multivibrator circuits 35 and 37 each of which consists of two monostable multivibrators; frequency dividers 32 and 36; a delay circuit 33; a field memory writing control circuit 38; a system controller 39; and a reproduced video signal processing circuit 41.

In the case of ordinary reproduction, the connecting position of the switch 40 is on one side or terminal f thereof. A reproduced video signal coming via the terminal 1 is processed by the reproduced video signal processing circuit 41 and is then produced via the switch 40.

In this instance, each pilot signal which is introduced via the LPF 2 is subjected to a multiplying operation performed in a known manner by the multiplier 3 together with a local pilot signal having the same frequency as that of the pilot signal recorded in a recording track under tracking control. The output of the multiplier 3 is supplied to the BPFs 5 and 6. The BPF 5 then produces a signal component of a frequency fH ($=f2-f1=f3-f4$). The BPF 6 produces a signal component of a frequency 3 fH ($=f4-f1=f3-f2$). These signal components of frequency values fH and 3 fH are rectified by the detectors 7 and 8 and a difference between them is extracted by the differential amplifier 9. The above stated frequency fH is a horizontal scanning frequency. The signal components fH and 3 fH represent pilot signal components reproduced from two adjacent tracks located on both sides of the track under control. The directions in which these components fH and 3 fH are obtained change from one over to the other for every track. Therefore, the output of the differential amplifier 9 and the same output which has its polarity inverted by the inverter 10 are switched from one over to the other by the switch 11 at the switching timing defined by a 30 PG signal. The switch 11 thus produces an ATF signal. The ATF signal from the switch 11 is supplied via the switch 13 to a capstan motor control circuit 14. The circuit 14 then controls the phase of the capstan motor 15 according to the ATF signal.

The video signal supplied to the LPF 16 is next supplied to the A/D converter 17. Then, in synchronism with the synchronizing signal separated by the synchronizing signal separating circuit 21, the converter 17 samples the video signal according to a clock signal of a frequency 4 fsc (fsc: color subcarrier frequency) generated by the clock signal generating circuit 22. The video signal is thus quantized with eight bits into a digital signal. The quantized digital signal is written into the field memory 18 in synchronism with the clock signal of the frequency 4 fsc produced from the clock signal generating circuit 22 at an address determined by the writing address control circuit 23. The digital signal written into the field memory 18 is read out from an address determined by the reading address control circuit 24 in synchronism with a clock signal of the frequency 4 fsc which is produced from the reference clock signal generating circuit 25 without any time base variations. The digital signal thus read out is converted into an analog signal by the D/A converter 19. Then, if the connecting position of the switch 40 is on the side e thereof, the analog signal can be produced via the LPF 20.

Next, the VTR performs a slow motion reproducing operation in the following manner: In the case of slow motion reproduction, the connecting position of the switch 40 is shifted to its side e by an instruction of the system controller 39 for slow motion reproduction. Slow motion reproducing operations can be divided into two cases. One is reproduction at a speed which is an odd-number fraction of the tape speed employed in recording while the other is reproduction at a speed an odd-number fraction of the recording tape speed. In the following, the former is represented by a ½ speed slow motion reproducing operation and the latter by a ⅓ speed slow motion reproducing operation.

In the case of ½ speed reproduction: Upon receipt of an instruction for a ½ speed slow motion reproducing operation, the system controller 39 instructs the capstan motor control circuit 14 to have the capstan motor 15 rotate at a speed ½ of its ordinary speed. The connecting position of the switch 34 is shifted to one side or terminal d thereof. The local pilot signal generating circuit 4 and the field memory writing control circuit 38 are controlled in a manner as will be described later. Then, there obtain conditions as represented by a track pattern and a timing chart shown in FIGS. 5(a) to 5(h).

Figure 5A:
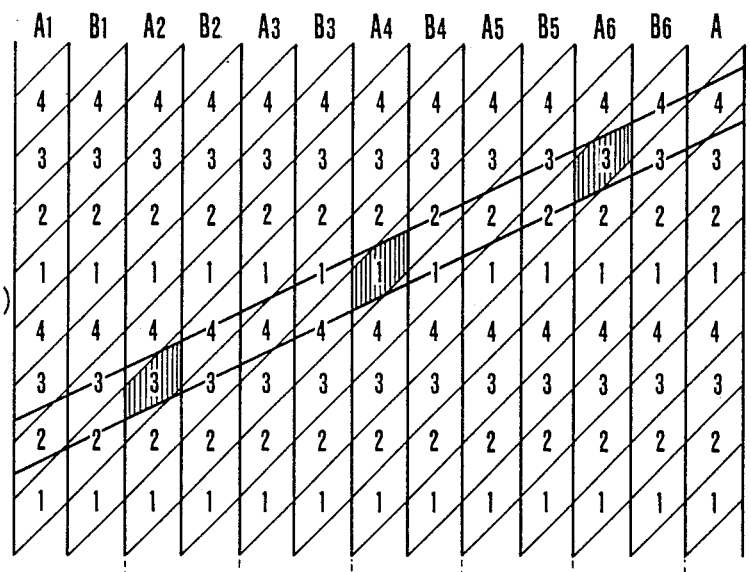
FIGS. 5(a) to 5(h) show in a timing chart the ½ speed reproducing operation of the VTR of FIG. 4.
Figure 5B:
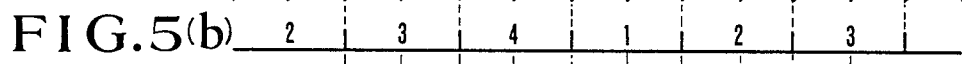
Figure 5C:
Figure 5D:
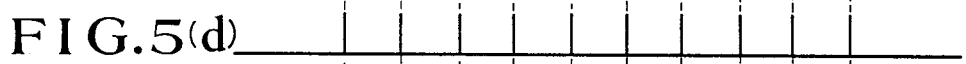
Figure 5E:
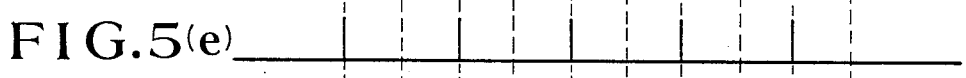
Figure 5F:
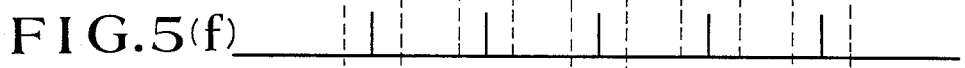
Figure 5G:
Figure 5H:

FIG. 5(a) analytically shows in a track pattern the tape tracing state of the head. FIG. 5(b) shows a frequency switch-over action performed on the local pilot signals. FIG. 5(c) shows the 30 PG signal. FIG. 5(d) shows the output wave form of the edge detection circuit 31. FIG. 5(e) shows a wave form obtained by frequency dividing the wave form of FIG. 5(d) by ½. FIG. 5(f) shows a wave form obtained by delaying the wave form of FIG. 5(e) for ½ field period by means of the delay circuit 33. FIG. 5(g) shows a wave form obtained by frequency dividing the wave form of FIG. 5(e) by ½. FIG. 5(h) shows the output of the monostable multivibrator 37.

In response to the instruction for ½ speed slow reproduction, the local pilot signal generating circuit 4 produces local pilot signals by switching one signal over to another for every two fields as shown in FIG. 5(b). The edge detection circuit 31 generates pulses as shown in FIG. 5(d) at the rise and fall edges of the 30 PG signal which is as shown in FIG. 5(c). The output of the edge detection circuit 31 is frequency divided by ½ by the frequency divider 32 as shown in FIG. 5(e). The frequency divider 32 is arranged to divide the frequency by 1/N and to be brought into a state of K=N by a control signal produced from the system controller 39 in the case of 1/K speed slow motion reproduction. The output of the frequency divider 32 is supplied to the delay circuit 33 which is arranged to delay it for 1/120 sec and also to the terminal d of the switch 34. The output of the delay circuit 33 is supplied to the S/H circuit 12, which samples and holds the ATF signal according to the output of the circuit 33. The output of the S/H circuit 12 controls the capstan motor by coming via a switch 13. Meanwhile, the output of the frequency 32 divider which passes through a switch 34 is frequency divided further by ½ by a ½ frequency divider 36 and is brought into a state as shown in FIG. 5(g). The output of the frequency divider 36 is supplied to the monostable multivibrator 37. The vibrator 37 is set by the output of the divider 36 and is reset after the lapse of 1/60 sec (after one field period) as shown in FIG. 5(h). The address control circuit 23 is arranged in such a way as to rewrite or renew data stored at the field memory only when the output of the monostable multivibrator 37 is at a high (H) level.

In the case of ⅓ speed slow reproduction, which is taken here as an example of the slow motion reproducing operation of the VTR to be carried out at an odd-number fraction of the ordinary speed: Upon receipt of an instruction for ⅓ speed slow reproduction, the capstan motor control circuit 14 causes the capstan motor 15 to rotate at ⅓ of its ordinary speed. The connecting position of the switch 13 is shifted to its terminal b. The local pilot signal is switched from one frequency over to another as shown in FIG. 6(b). The 1/N frequency divider 32 is adjusted to have the "N" set at 3. The connecting position of the switch 34 is shifted to its terminal c.

FIGS. 6(a) to 6(g) show in a timing chart the operation f various parts of FIG. 4. FIG. 6(a) analytically shows in a track pattern the tape tracing state of the head. FIG. 6(b) shows the local pilot signals as in a state of being switched from one over to another. FIG. 6(c) shows the 30 PG signal. FIG. 6(d) shows the output wave form of the edge detection circuit 31. FIG. 6(e) shows the output wave form of the frequency divider 32 obtained by frequency dividing the wave form of FIG. 6(d) by ⅓. FIG. 6(f) shows a wave form obtained by delaying the wave form of FIG. 6(e) by means of the delay circuit 33. FIG. 6(g) shows the output wave form of the monostable multivibrator 35.

The S/H circuit 12 samples and holds the ATF signal according to the sampling pulse signal obtained, in the same manner as in the case of slow motion reproduction, at the speed an even-number fraction of the ordinary speed, by delaying the output of the frequency divider 32 for ½ field (1/120 sec). The phase of the capstan motor 15 is thus controlled by the output of the S/H circuit 12. The output of the frequency divider 32 is also supplied via the terminal c of the switch 34 to the monostable multivibrator 35. As shown in FIG. 6(g), the monostable multivibrator 35 is set by the output of the frequency divider 32 and is then reset after the lapse of 1/60 sec. The output of the vibrator 35 is supplied to the field memory writing control circuit 38. The data stored at the field memory 18 is renewed only when the output of the vibrator 35 is at a high level.

With the VTR arranged as described above, the field memory 18 always have an adequate video signal written therein as obvious from FIGS. 5(a) to 5(h) and 6(a) to 6(g). Therefore, the VTR gives a slow motion reproduced picture with high quality.

While the slow motion reproducing operation of this embodiment has been described taking as examples the ½ speed and ⅓ speed reproducing operations, the invented arrangement is likewise applicable also to reproducing operations to be carried out at a tape speed not exceeding a speed two times as high as the tape speed normally employed in recording. For example, in the event of reproduction at a speed (2−1/a) times as high as the recording speed, the VTR operates as follows: In that event, the inclination of the tracing locus of the head relative to the track is the same as in the case of 1/a speed slow motion reproduction. Therefore, the ATF signal is sampled and held for every "a" number of fields, if the "a" is an odd number, and for every 2a number of fields if the "a" is an even number.

In the embodiment described, a tape-shaped record bearing medium is allowed to travel at a speed different from the recording speed; a reproduced video signal is written into the field memory in units of one field at intervals corresponding to the tape travel speed employed; and a tracking error signal obtained from reproduced pilot signals according to the timing of writing into the field memory is sampled and held. This arrangement enables the VTR to control the sampling point of the tracking error signal in such a way as to obtain the maximum reproduction output in the middle of each field irrespectively of the traveling speed of the record bearing medium. Therefore, only such a field portion of the video signal that gives a sufficiently large reproduction output is stored at the field memory. The embodiment, therefore, ensures reproduction of pictures with excellent quality.

While this embodiment is capable of excellently carrying out altered speed reproduction as mentioned above, the video signal portion to be written into the field memory might become inadequate if the linearity of the track is accidentally impaired or if the tracking control is not in order.

Figure 7:
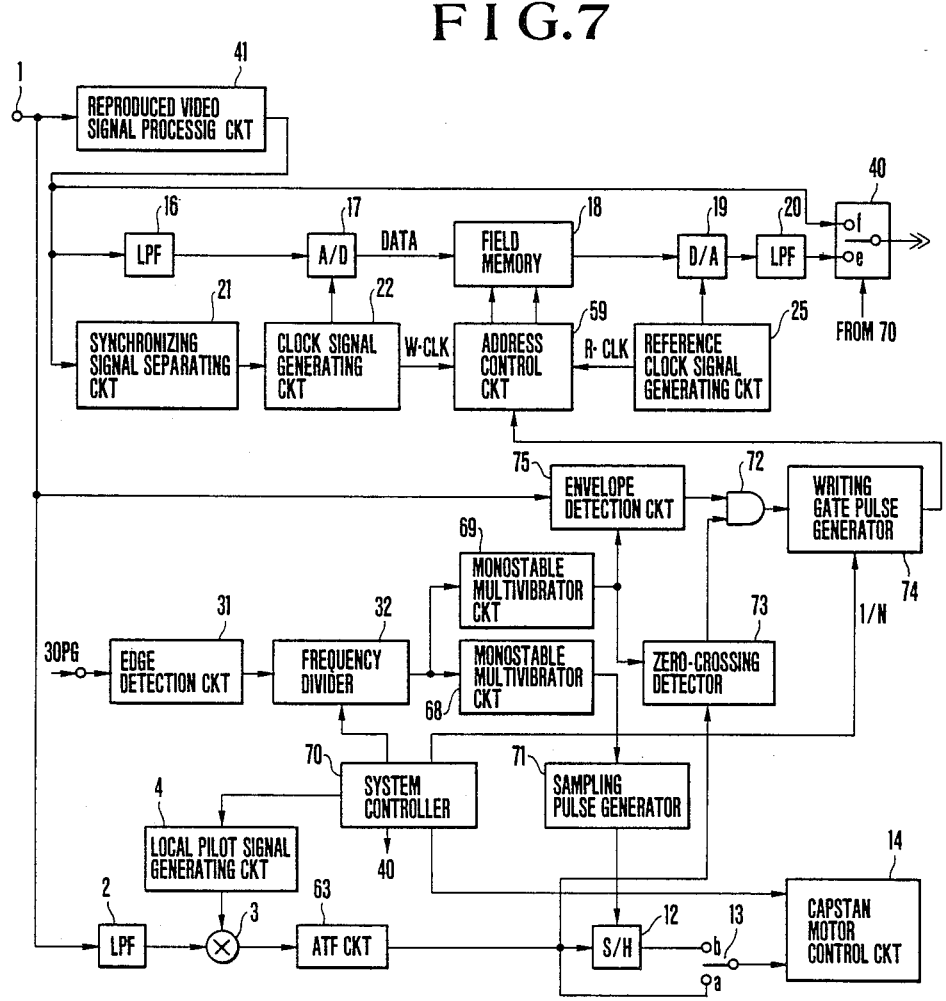
FIG. 7 is a block diagram showing the essential parts of the reproduction system of a VTR arranged as another embodiment of this invention.

FIG. 7 shows the essential parts of the reproduction system of a VTR arranged to solve the above stated problem as another embodiment of this invention. In FIG. 7, the same components as those of FIG. 4 are indicated by the same reference numerals. Referring to FIG. 7, an address control circuit 59 which is arranged in combination with the field memory 18 includes the circuit elements 23 and 24 of FIG. 4. An ATF circuit 63 includes the circuit elements 5 to 11 of FIG. 4. The embodiment further comprises monostable multivibrators 68 and 69; a system controller 70; a sampling pulse generator 71; an AND circuit 72; a zero-crossing detector 73 for the ATF signal; a writing gate pulse generator 74; and a reproduced RF signal envelope detection circuit 75.

The ordinary reproducing operation of this embodiment is similar to that of the VTR shown in FIG. 4 and is, therefore, omitted from the following description.

Figure 8A:
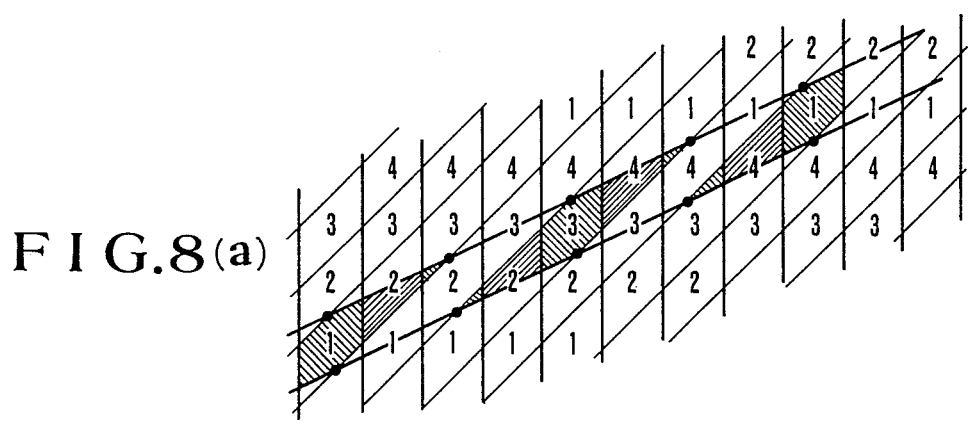
FIGS. 8(a) to 8(k) show in a timing chart the ½ speed reproducing operation of the VTR of FIG. 7.
Figure 8B:
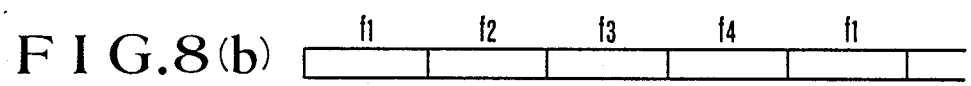
Figure 8C:
Figure 8D:
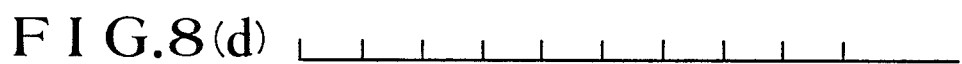
Figure 8E:
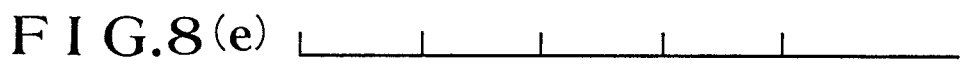
Figure 8F:
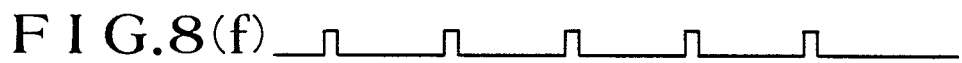
Figure 8G:
Figure 8H:
Figure 8I:
Figure 8J:
Figure 8K:
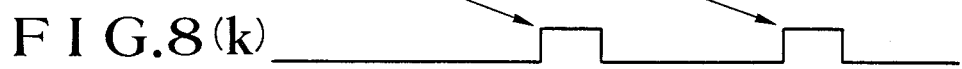

The slow motion reproducing operation of this embodiment is as described below with reference to the timing charts of FIGS. 8(a) to 8(k) and 9(a) to 9(k), which show by way of example the ½ speed reproducing operation and the ⅓ speed reproducing operation:

FIG. 8(a) analytically shows the tape tracing state of the head as in the form of a track pattern. FIG. 8(b) shows a frequency switch-over action performed on local pilot signals. FIG. 8(c) shows the wave form of the ATF signal. FIG. 8(d) shows the output wave form of the edge detection circuit 31. FIG. 8(e) shows the output wave form of the frequency divider 32. FIG. 8(f) shows the output wave form of the monostable multivibrator circuit 68. FIG. 8(g) shows the output wave form of the monostable multivibrator circuit 69. FIG. 8(h) shows the state of the output of the reproduced signal envelope detection circuit 75 which is supplied to the terminal 1 during a period corresponding to the output of the circuit 69. The output state is indicated by high (H) and low (L) levels of the output. FIG. 8(j) shows the output wave form of the AND circuit 72. FIG. 8(k) shows the output of the writing gate pulse generator 74.

When an instruction for ½ speed slow motion reproduction is supplied to the system controller 70. The system controller 70 causes the capstan motor control circuit 14 to have the capstan motor rotate at a speed ½ of the ordinary speed. The connecting position of the switch 40 is shifted to its terminal e. The value "N" of the 1/N frequency divider 32 is set at N=2. The switching of frequency of the local pilot signals to be generated by the local pilot signal generating circuit 4 from one frequency value over to another is set to be effected at intervals twice as long as the ordinary switching intervals as shown in FIG. 8(b). The rewriting pulse generating timing of the writing gate pulse generator 74 is controlled as will be described later. The edge detection circuit 31 which receives the 30 PG signal produces a pulse signal which are synchronized with the rise and fall of the 30 PG signal as shown in FIG. 8(d). This pulse signal is frequency divided by ½ by the frequency divider 32 as shown in FIG. 8(e). The frequency divided pulse signal is delayed by the monostable multivibrator circuits 68 and 69 as shown in FIGS. 8(f) and 8(g). This delay is effected for the purpose of having the zero crossing point of the ATF signal and the maximum point of the envelope of the reproduced signal preferably detected at the middle of the field as shown in FIGS. 8(c) and 8(a). The output of the monostable multivibrator 68 is supplied to the sampling pulse generator 71. The generator 71 then produces sampling pulses. The sample-and-hold (S/H) circuit 12 then samples the ATF signal according to the sampling pulses. Further, the output of another monostable multivibrator circuit 69 is obtained in a state as shown in FIG. 8(g) and is supplied to the envelope detection circuit 75 and also to the ATF signal zero-crossing detector 73. The two detection outputs thus obtained are applied to the AND circuit 72 to obtain their logical product. The logical product is supplied to the writing gate pulse generator 74 which produces its output in a state as shown in FIG. 8(j). When the output level of the AND circuit 72 is high (H), it indicates that the field portion of the video signal which is presently reproduced gives a high reproduction output level and is, therefore, highly suited for rewriting therewith the content of the field memory 18. In the case of ½ speed slow motion reproduction, the output level of the AND circuit 72 recurrently becomes high at intervals of four fields as long as the capstan motor is in a normal state. It is, therefore, predictable that every fourth field after occurrence of the high level output of the AND circuit 72 will be also highly suited for rewriting. In view of this, the output of the AND circuit 72 is arranged to be delayed to a degree corresponding to four fields in response to the output of the system controller 70 indicating that the VTR is in process of ½ speed slow motion reproduction. As a result of this arrangement, pulses are obtained as shown in FIG. 8(k).

In the case of the 1/N (N: an even number) speed slow motion reproduction, the embodiment thus detects a field portion of the video signal best suited for rewriting the memory in a cycle of 2N, as shown in FIG. 8(a).

Further, the output of the writing gate pulse generator 74 is supplied to the address control circuit 59. The circuit 59 controls this pulse input in such a manner that the content of the field memory is renewable only when the pulse input is at a high (H) level.

Next, when an instruction for ⅓ speed slow motion reproduction is given, the system controller 70 causes the capstan motor control circuit 14 to rotate the capstan motor at a speed ⅓ of its ordinary rotating speed. The connecting position of the switch 40 is shifted to its terminal b. The frequency dividing rate 1/N of the frequency divider 32 is set at N=3. The frequency switch-over cycle of the local pilot signal generating circuit 4 is reduced to ⅓ as shown in FIG. 9(b). The writing gate pulse generator 74 receives a signal instructing it to delay the output signal of the AND circuit 72 to a degree corresponding to six fields. The operation of each part is similar to that of the ½ speed slow motion reproduction and, therefore, the details of it are omitted from the following description. However, in this instance, the cycle in which the output of the AND circuit 72 which comes to indicate the field best suited for rewriting differs. As obvious from FIGS. 9(a) and 9(c), in the case of the ⅓ speed slow motion reproduction, the field portion of the video signal which has the tracking effect adequately attained in the middle thereof thus having a maximum envelope of the reproduction output is obtained in a cycle of three field periods.

Generally, in the case of slow motion reproduction at a 1/N (N: an odd number) speed, the field best suited for rewriting is detected in a cycle of a period N. Therefore, the field for which the output level of the AND circuit 72 becomes high is obtained at intervals of an N number of field periods.

In the case of slow motion reproduction at a 1/K speed, the control signal from the system controller 70 causes the rotating speed of the capstan motor to be 1/K of its ordinary speed. The frequency dividing rate of the 1/N frequency divider 32, in this case, is set at N=K. The frequency switch-over period of the local pilot signal generating circuit 4 is set at 1/K. The delaying degree of the writing gate pulse generator 74 is set at a degree corresponding to 2 K fields. The connecting position of the switch 40 is shifted to its terminal e.

The embodiment described above is capable of giving an adequate slow motion reproduced signal even in the event of deteriorated linearity of tracks because no inadequately reproduced signal is stored in the memory.

Figure 10:
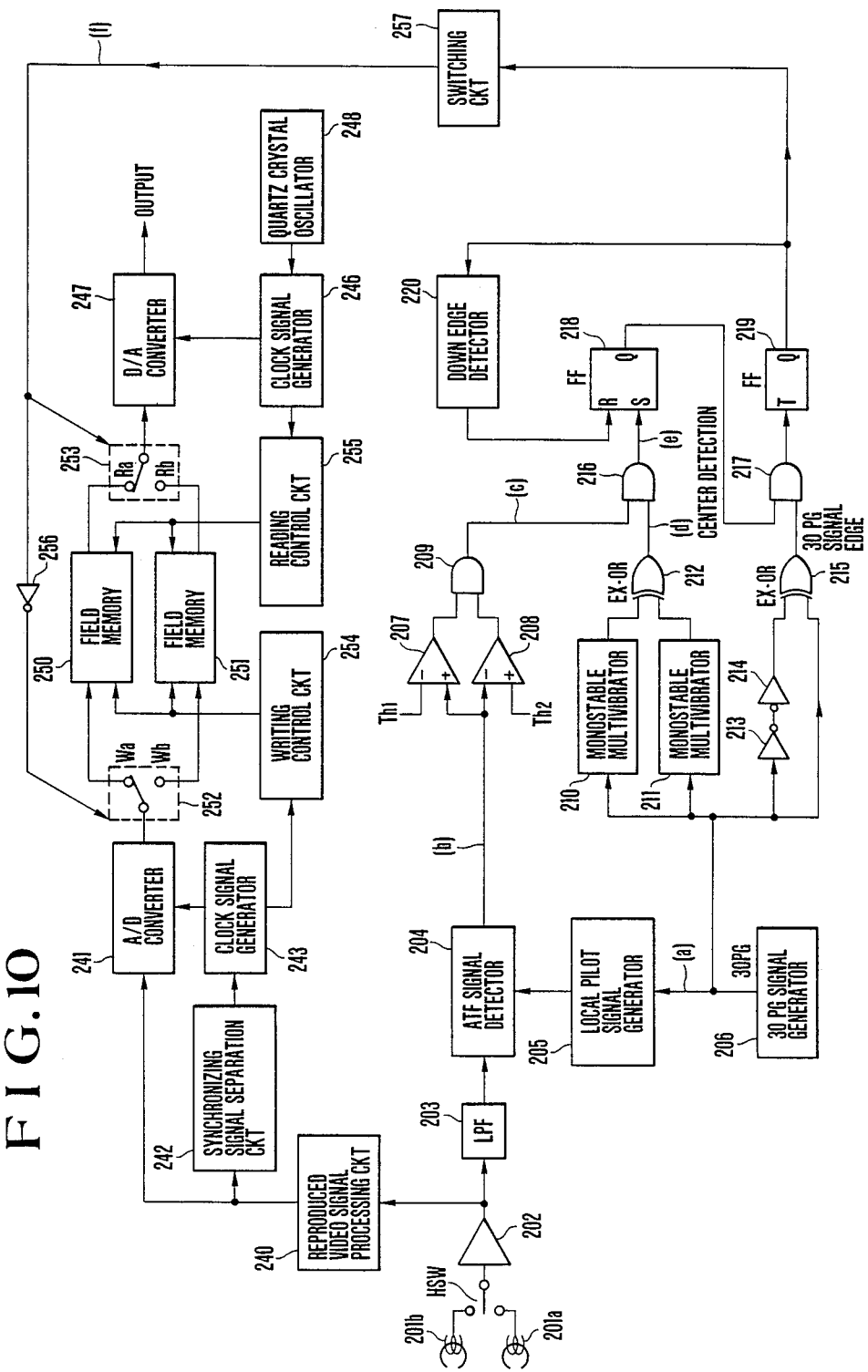
FIG.10 is a block diagram showing the essential parts of the reproduction system of a VTR arranged as a further embodiment of this invention.
Figure 11:
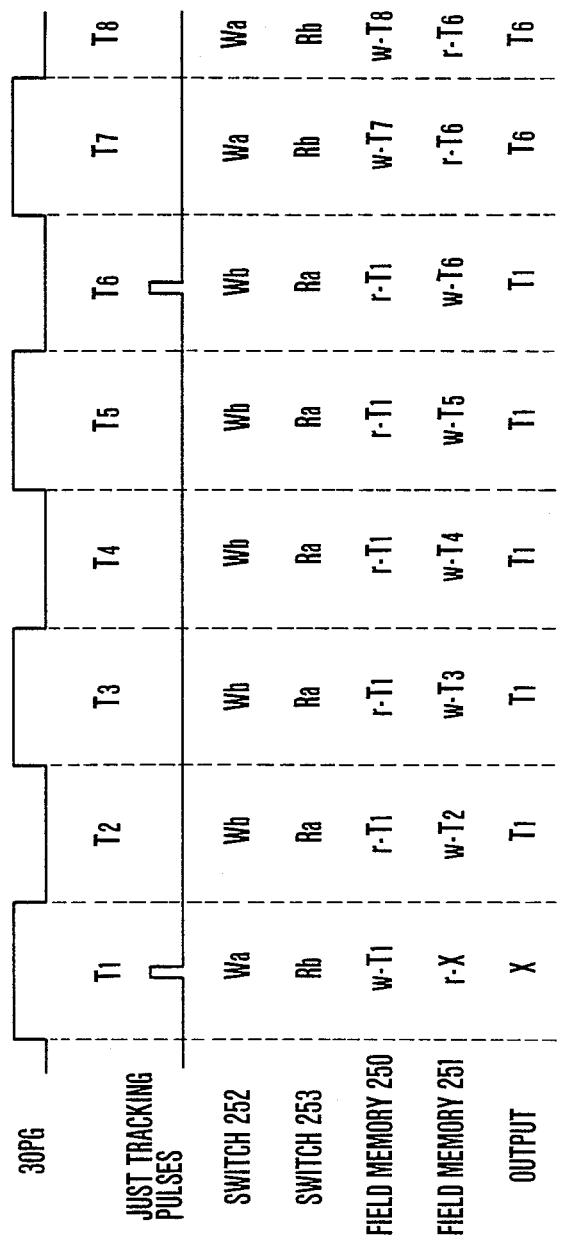
FIG. 11 is a chart showing the operation of the VTR of FIG. 10.

FIG. 10 shows the reproduction system of a VTR which is arranged as another embodiment of this invention capable of solving the problem arising from the above stated adverse conditions. FIG. 11 is a timing chart showing the operation of various parts of the same VTR. The basic concept of this embodiment is as follows:

FIG. 12 shows the tape tracing pattern of the head obtained on the tape during ¼ speed slow motion reproduction. FIGS. 13(a) to 13(f) show in a timing chart the operation of this embodiment. Referring to FIG. 12, reference symbols T1 to T8 denote the tracing loci of the rotary heads of the VTR. Of these tracing loci, tracing loci shown by full lines represent those of the rotary head of a positive azimuth and tracing loci shown by broken lines those of the rotary head of a negative azimuth. Marks (+) and (−) in FIG. 12 denote the azimuths of tracks formed on the tape.

FIG. 13(a) shows the 30 PG signal which is of 30 Hz and is in synchronism with the rotation of a rotary drum carrying the heads. In FIG. 13(a), parts T1 to T8 correspond to the tracing loci shown in FIG. 12. FIG. 13(b) shows a tracking control (ATF) signal which is obtained from the known pilot signals of four different frequency values and is produced by a tracking control (ATF) circuit. The ATF signal of FIG. 13(b) is formed in the following manner:

The level of the ATF signal of FIG. 13(b) comes to a zero point at each of time points P1, P2, P3, —at which the head passes the middle part of each track. FIG. 13(c) shows detection pulse signal indicating the zero-crossing points of the ATF signal. As indicated by the parts T1 and T6, the best tracing pattern is to have the head come to the middle part of the track of the same azimuth angle as that of the head at the middle of its tracing locus. To detect this, center pulses are generated in such a way as to become a high level at about the middle point of each tracing locus as shown in FIG. 13(d). The logical product of the center pulses and the zero-crossing detection pulses of FIG. 13(c) is obtained. As a result of this, a just tracking pulse signal which gives an adequate tracing pattern is produced in a state as shown in FIG. 13(e). In other words, the field portion of the reproduced video signal for which this just tracking pulse signal is produced is in an excellent state. Therefore, the VTR is arranged to produce such field portions of the video signal.

In brief, the above stated ATF signal is obtained in the following manner: In accordance with the known four-frequency method, the pilot signals of four different frequency values are recorded in rotation in the recording tracks, one in each of the track, in the sequence of frequency values f1, f2, f3 and f4. Then, during reproduction, the pilot signals included in the reproduced signal are multiplied by signals called local pilot signals which are also of the four different frequency values and generated in rotation, for example, in the sequence of frequency values f1, f2, f3 and f4. After this multiplying operation, the ATF signal is obtained by comparing a component fA (=f2−f1=f3−f4) included in the result of comparison and another component fB (=f4−f1=f3−f2) with each other. This is because: The frequency of the pilot signals reproduced from the tracks under control varies in the order of frequency values f1, f2, f3 and f4 during normal reproduction. The frequency of the local pilot signals is, therefore, arranged to be varied also in the order of f1, f2, f3 and f4 and the above stated components fA and fB are arranged to represent tracks neighboring the track under control on both sides thereof.

In the case of a ¼ speed slow motion reproducing operation, this embodiment does not particularly set any track to be mainly controlled. It is necessary, however, to avoid making any just-tracking judgment while the head is tracing a track which is of a different azimuth angle from that of the head. Assuming that a positive azimuth track always has either the pilot signal of the frequency f1 or f3 recorded therein and a negative azimuth track the pilot signal of the frequency f2 or f4, it is necessary to produce the local pilot signal of the frequency f1 or f3 when the head of the positive azimuth is tracing the tape and the local pilot signal of the frequency f2 or f4 when the head of the negative azimuth is tracing the tape. In the case of this embodiment, the polarity of the ATF signal presents no problem because the ATF signal is used only for detecting a state of zero tracking error. Hence, in this case, the local pilot signals can be either of the frequency values f1 and f3 or f2 and f4 in the above stated instances.

In the case of this embodiment, the ATF signal is obtained with the local pilot signals generated by rotation in the sequence of frequency values f1, f2, f3 and f4 in the same manner as in ordinary reproduction.

The reproduced video signal is obtainable in an adequate state, as mentioned in the foregoing, by writing into the field memory the field portion of the video signal for which a just tracking pulse is generated. However, it is impossible to record in the field memory the video signal field portion having the just tracking pulse after detection of the just track state. Therefore, this embodiment is provided with a pair of field memory devices, one for writing and the other for reading. The use of the writing and reading field memory devices is switched from one over to the other immediately after the just tracking pulse is generated. FIG. 13(f) shows a switching signal for controlling this switch-over action.

Referring to FIG. 10, the embodiment comprises heads 201a and 201b; a head output amplifier 202; a low-pass filter (LPF) 203; an ATF signal detector 204; a 30 PG signal generator 206; comparators 207 and 208; AND circuits 209, 216 and 217; monostable multivibrators 210 and 211; exclusive OR (EX-OR) circuits 212 and 215; inverters 213 and 214; flip-flops (FFs) 218 and 219; a down edge detector 220; a reproduced video signal processing circuit 240; an analog-to-digital (A/D) converter 241; a synchronizing signal separation circuit 242; a clock signal generator 243; a writing control circuit 254; a reading control circuit 255; a reference clock signal generator 246; a digital-to-analog (D/A) converter 247; a quartz crystal oscillator 248; field memories 250 and 251; and switches 252 and 253.

A video signal reproduced by the heads 201a and 201b is supplied via a head change-over switch HSW to the head output amplifier 202 to be amplified there. The amplified video signal is supplied to the LPF 203. The LPF 203 extracts only a pilot signal component recorded on the tape. The pilot signal component is supplied to the ATF signal detector 204. The detector 204 then performs a multiplying operation on the pilot signal component and the local pilot signal produced from the local pilot signal generator 204 to obtain an ATF signal which is as shown in FIG. 13(b). The 30 PG signal generator 206 generates a 30 PG signal which is as shown in FIG. 13(a) and is used for controlling the above stated switch HSW and also the local pilot signal generator 205. The generator 205 is controlled to supply the ATF signal detector 204 with local pilot signals in the order of frequencies f1, f2, f3 and f4.

The ATF signal thus obtained is applied to a zero-crossing detector which is composed of the comparators 207 and 208 and the AND circuit 209. The detector then produces a pulse signal at a high level at a zero-crossing point of the ATF signal.

A reference symbol Th1 denotes a reference voltage which is a little lower than zero. Another reference symbol Th2 denotes a reference voltage which is a little higher than zero. A pulse signal which is as shown in FIG. 13(c) is produced at a high level from the AND circuit 209 only when the ATF signal shown in FIG. 13(b) is at a level between these two reference voltages. Meanwhile, the 30 PG signal is supplied to a center detecting part which is composed of the monostable multivibrators 210 and 211 and the EX-OR circuit 212. The center detecting part then generates center pulses as shown in FIG. 13(d). In the case of a VTR of the kind handling video signals of the NTSC color system like this embodiment, the setting time values of the two monostable multivibrators 210 and 211 are somewhat deviating from 1/120 sec on the plus and minus sides of it respectively. Assuming that the degree of this deviation is ±Δt, the width of each pulse in the middle of the field as shown in FIG. 13(d) is 2Δt. The opportunity of writing the video signal would diminish if the width Δt is excessively small. However, if the width is excessively large, a portion of the video signal which is not in an adequate state would be written into the field memory.

A logical product of the zero-crossing pulse of FIG. 13(c) and the center pulse of FIG. 13(d) is obtained by the AND circuit 216. Then, a just tracking pulse is obtained in a state as shown in FIG. 13(e). The FF 218 is set by means of this pulse. The output level of the FF 218 becomes high when a just tracking state is obtained to open the AND circuit 217 thereby. Another input terminal of the AND circuit 217 is arranged to receive a pulse signal the level of which becomes high at the rise and fall edges of the 30 PG signal. This 30 PG edge pulse signal is formed by the EX-OR circuit 215 by obtaining an exclusive logical sum of the 30 PG signal of FIG. 13(a) and a signal obtained by delaying the 30 PG signal by means of inverters 213 and 214. After a just tracking state is thus obtained, the output level of the FF 219 is made high by the next pulse of the 30 PG edge signal and then made low by another pulse of this signal. The change from the high level to the low level of the output of the FF 219 is detected by the down edge detector 220. When this change is detected, the FF 218 is reset. With the FF 218 reset, the 30 PG edge signal is no longer allowed to pass the AND circuit 217. The above stated series of processes then comes to an end with a pulse which measures 1/60 sec in width produced, in the case of the NTSC system.

Meanwhile, the output of the head output amplifier 202 is demodulated in a known manner by the reproduced video signal processing circuit 240 into a composite television signal of the NTSC system. The demodulated signal is A/D converted by the A/D converter 241. The data thus produced from the converter 241 as a result of conversion is stored at the field memory device 250. The data conversion timing is determined by a clock signal generated by the clock signal generator 243 on the basis of a synchronizing signal generated by the synchronizing signal separation circuit 242. This clock signal of the clock signal generator 243 is used also for controlling the timing of writing into the field memories 250 and 251 in synchronism with the A/D conversion.

Next, a reference clock signal is generated by the reference clock signal generator 246 by using the oscillation output of the quartz crystal oscillator 248. The D/A converter 247 performs D/A conversion according to this reference clock signal. The reference clock signal is used also for controlling the timing of reading from the field memories 250 and 251.

In the arrangement shown in FIG. 10, the signal of FIG. 13(f) is formed by triggering a switching circuit 257 which consists of a T-FF. The connecting position of each of the switches 252 and 253 is shifted to its opposite terminal every time the output of the FF 219 rises.

At that time, the inverter 256 acts to have the connecting positions of the switches 252 and 253 conversely shifted between their terminals a and b. After a just tracking pulse is generated, the connecting positions of these switches 252 and 253 are shifted at the first timing of switching from one field to another.

Referring to FIG. 11, the VTR of FIG. 10 operates as follows: Assuming that a just tracking pulse is obtained for a field T1, the switching signal of FIG. 13(f) is inverted at the shifting timing of the reproduced video signal from the field T1 to a next field T2. Then, the field memory 250 changes from a writing state w to a reading state r as shown in FIG. 11. In other words, the connecting position of each of the switches 252 and 253 is changed from one terminal thereof over to the other as shown in FIG. 11. At the reproduction timing of the field portion T2 of the video signal and thereafter, the field portion T1 of the reproduced video signal is repeatedly read out from the field memory 250 until the just tracking pulse is again generated, as indicated by "r-T1" in FIG. 11. Concurrently with this, the field portion T2 of the reproduced video signal and ensuing field portions are written into the field memory 251, as indicated by "w-T2, w-T3, . . . " in FIG. 11, until the just tracking pulse is again generated.

Assuming that the next just tracking pulse is generated for a field portion T6 of the reproduced video signal, the connecting positions of the switches 252 and 253 are shifted at the change-over timing from the field T6 to another field T7. Then, the field portion T6 of the reproduced video signal is read out from the field memory 251. Then, the field memory 250 stores the field portion T7 of the reproduced video signal and ensuing field portions thereof one after another.

In the embodiment shown in FIG. 10, as described above, the field portion T1 of the reproduced video signal is first repeatedly read out for five consecutive ensuing fields via the D/A converter 247. After that, the field portion T6 of the video signal is repeatedly read out. As obvious from FIG. 12, the field portions T1 and T6 of the video signal are recorded in adjacent tracks with a time difference of 1/60 sec between them. Therefore, the arrangement described above provides a slow motion reproduced picture.

An advantageous feature of the embodiment described resides in that: Reproduction of a video signal in an adequate state is first confirmed. Then, the confirmed adequate portion of the video signal is alone produced. This arrangement thus ensures that only adequately reproduced portions of the video signal are allowed to be produced.

In the case of the embodiment described, the zero point of the tracking error is arranged to be detected by means of a tracking error signal obtained by the four-frequency method. However, in the case of azimuth recording, this arrangement may be changed, for example, to detect the maximum level of the reproduced signal.

What is claimed is:

1. An apparatus for reproducing a video signal from a record bearing medium on which many recording tracks are formed in parallel with each other, a predetermined period of video signal being recorded in every recording track comprising:

(a) a reproducing head which traces said record bearing medium;

(b) memory means which receives said video signal reproduced by said reproducing head and stores said predetermined period of said video signal;

(c) tracking error signal forming means for forming a tracking error signal indicative of a relative position between said track and said head by using signals reproduced by said reproducing head;

(d) moving means for moving said record bearing medium in a direction different from the medium tracing direction of said reproducing head;

(e) moving control means for controlling and causing said moving means to move said record bearing medium at a speed different from a medium moving speed employed when said recording tracks are formed;

(f) writing control means for determining whether or not every said predetermined period of said video signal reproduced by said reproducing head is to be written into said memory means;

(g) sampling means for sampling said tracking error signal at intervals of a period which is an integral multiple of said predetermined period; and (h) tracking control means for controlling, in response to the tracking error signal sampled by said sampling means, the relative position between said recording track and said reproducing head.

2. An apparatus according to claim 1, wherein said writing control means is operative to allow the predetermined period of said video signal reproduced by said reproducing head to be written into said memory means for every period which is an integral multiple of said predetermined period.

3. An apparatus according to claim 1, wherein said writing control means is operative according to said tracking error signal.

4. An apparatus according to claim 3, wherein said writing control means includes detecting means for detecting said tracking error signal for every period which is an integral multiple of said predetermined and is operative according to said tracking error signal detected by said detecting means.

5. An apparatus according to claim 4, wherein said writing control means determines, whether or not said video signal is to be written into said memory means after the lapse of a period which is an integral multiple of said predetermined period from the time of detection of said tracking error signal according to the tracking error signal detected by said detecting means.

6. An apparatus according to claim 1, wherein said writing control means includes detecting means for detecting the envelope of the signal reproduced by said reproducing head operates by using the output of said detecting means.

7. An apparatus according to claim 6, wherein said detecting means detects the envelope of the signal reproduced by said reproducing head for every period which is an integral multiple of said predetermined period.

8. An apparatus according to claim 7, wherein said writing control means determines, according to the level of said envelope detected by said detecting means, whether or not said video signal is to be written into said memory means after the lapse of a period which is an integral multiple of said predetermined period from timing of the detecting of said envelope.

9. An apparatus according to claim 1, wherein said tracking control means controls the medium moving phase of said moving means.

10. An apparatus according to claim 1, wherein said reproducing head includes a rotary head; and said predetermined period corresponds to the rotating period of said rotary head.

11. An apparatus according to claim 10, wherein said predetermined period corresponds to a period of one field of said video signal.

12. An apparatus according to claim 1, wherein said moving control means controls and causes said moving means to move said record bearing medium at a speed not exceeding a speed two times a speed at which said medium is moved when said tracks are formed and in the same direction as the direction in which said tracks are formed.

13. An apparatus according to claim 12, wherein said moving control means controls and causes said moving means to move said record bearing medium at a speed 1/n (n: a positive integer) of the medium moving speed employed when said tracks are formed.

14. An apparatus according to claim 13, wherein said sampling means samples said tracking error signal at intervals of a period n times said predetermined period.

15. An apparatus according to claim 14, wherein said many tracks have different azimuth angles between adjacent tracks; and said reproducing head includes a pair of rotary heads which are of different azimuth angles and trace in rotation said record bearing medium.

16. An apparatus according to claim 15, wherein said writing control means causes the predetermined period of said video signal reproduced by said reproducing head to be written into said memory means every period which is n times said predetermined period when said n is an odd number.

17. An apparatus according to claim 15, wherein said writing control means causes the predetermined period portion of said video signal reproduced by said reproducing head to be written into said memory means every period which is 2n times said predetermined period when said n is an even number.

18. An apparatus for reproducing a video signal from a record bearing medium on which many recording tracks are formed in parallel with each other, a predetermined period of video signal being recorded in every recording track, comprising:

(a) a reproducing head which traces said record bearing medium;

(b) memory means which receives said video signal reproduced by said reproducing head and stores said predetermined portion of the video signal reproduced by said reproducing head;

(c) tracking error signal forming means for forming, by using the signals reproduced by said reproducing head, a tracking error signal indicative of a relative position between said track and said head;

(d) moving means for moving said record bearing medium in a direction different from the medium tracing direction of said reproducing head;

(e) moving control means for controlling and causing said moving means to move said record bearing medium at a speed different from a medium moving speed employed when said recording tracks are formed; and p1 (f) writing control means for determining, according to said tracking error signal, whether or not every said predetermined period of said video signal reproduced by said reproducing head is to be written into said memory means.

19. An apparatus according to claim 18, wherein said writing control means includes detecting means for detecting said tracking error signal every period which is an integral multiple of said predetermined period and operates every period which is an integral multiple of said predetermined period by using said tracking error signal.

20. An apparatus according to claim 19, wherein said writing control means determines, according to the tracking error signal detected by said detecting means, whether or not said video signal is to be written into said memory means after the lapse of the period which is an integral multiple of said predetermined period from a timing of detection of said tracking error signal.

21. An apparatus according to claim 18, wherein said writing control means changes said memory means from a writable state over to a readable state and vice versa.

22. An apparatus for reproducing a video signal from a record bearing medium on which many recording tracks are formed in parallel with each other, a predetermined period of said video signal being recorded in every recording track, comprising:
    (a) a reproducing head which traces said record bearing medium;
    (b) a pair of memory means which receive said video signal reproduced by said reproducing head and store said predetermined period of said video signal reproduced by said reproducing head;
    (c) moving means for moving said record bearing medium in a direction different from the medium tracing direction of said reproducing head;
    (d) moving control means for controlling and causing said moving means to move said record bearing medium at a speed different from a medium moving speed employed when said recording tracks are formed; and
    (e) writing-and-reading control means for determining, for each of said pair of memory means, whether said memory means is to be brought into a writable state or to be brought into a readable state with respect to every said predetermined period.

23. An apparatus according to claim 22, wherein said writing-and-reading control means brings one of said pair of memory means into said readable state while the other is in said writable state.

24. An apparatus according to claim 23, further comprising means for forming, by using the signal reproduced by said reproducing head, a tracking error signal which is indicative of a relative position between said tracks and said reproducing head.

25. An apparatus according to claim 24, wherein said writing-and-reading control means operates according to said tracking error signal.

26. An apparatus according to claim 25, wherein said reproducing head includes a rotary head; and said writing-and-reading control means includes means for extracting said tracking error signal which is obtained when said rotary head is tracing the center portion of said track in the longitudinal direction thereof.

27. An apparatus according to claim 26, wherein said writing-and-reading control means changes, according to the tracking error signal extracted by said extracting means, the state of each of said pair of memory means between said writable and readable states when said rotary head is tracing the end part of said track.

* * * * *